United States Patent [19]
Hashizawa

[11] Patent Number: 5,820,395
[45] Date of Patent: Oct. 13, 1998

[54] CHARGING CONNECTOR FOR ELECTRIC VEHICLE

[75] Inventor: Shigemi Hashizawa, Haibara-gun, Japan

[73] Assignee: Yazaki Corporation, Tokyo, Japan

[21] Appl. No.: 760,424

[22] Filed: Dec. 4, 1996

[30] Foreign Application Priority Data

Dec. 6, 1995 [JP] Japan .................................. 7-317935

[51] Int. Cl.⁶ .................................................. H01R 13/00
[52] U.S. Cl. ............................................................ 439/271
[58] Field of Search .................................... 439/271, 272, 439/273, 281, 282, 283, 587, 589, 35, 374

[56] References Cited

U.S. PATENT DOCUMENTS

| | | | |
|---|---|---|---|
| 4,350,401 | 9/1982 | Allen et al. | 439/374 |
| 5,240,431 | 8/1993 | Yagi et al. | 439/271 |
| 5,324,208 | 6/1994 | Kodama et al. | 439/271 |
| 5,336,101 | 8/1994 | Kasugai et al. | 439/273 |
| 5,472,352 | 12/1995 | Nishide | 439/274 |

FOREIGN PATENT DOCUMENTS

| | | |
|---|---|---|
| 1-124979 | 5/1989 | Japan . |
| 5-290927 | 11/1993 | Japan . |

*Primary Examiner*—Hien Vu
*Assistant Examiner*—Tho Dac Ta
*Attorney, Agent, or Firm*—Armstrong, Westerman, Hattori, McLeland & Naughton

[57] ABSTRACT

The inner surface of a power supply side connector is covered with a circular waterproofing packing. The circular waterproofing packing is to be engaged with a power receiving side connector in a rear half of the waterproof packing. The inner surface of the power supply side connector is also covered with a packing holder for preventing the waterproofing packing from coming off a front half thereof. The packing holder has a circular protrusion for protecting the front end of the connector housing provided at the outer periphery of a front end of the packing holder. The packing holder is made of metal or synthetic resin having shock resistance.

2 Claims, 12 Drawing Sheets

FIG. 13
PRIOR ART

CHARGING CONNECTOR FOR ELECTRIC VEHICLE

BACKGROUND OF THE INVENTION

1. Field of the Invention

The present invention generally relates to a charging connector device for an electric vehicle and more particularly, to a charging connector device with improved shock resistance when a first connector on a power supply side is coupled to a second connector on a power receiving side.

2. Description of the Related Art

A charging connector device for an electric vehicle is generally required to have a structure which can endure 4000 repetition of use over a period of about ten years. Particularly, the power supply connector may slip out of the user's hand and fall down on the floor or the ground many times, while being carried, coupled and separated. In addition, it is possible that a vehicle may run over the power supply connector. Thus, it has been demanded that the connector device be developed so as to have a structure capable of resisting a large amount of shock.

Figure 12:
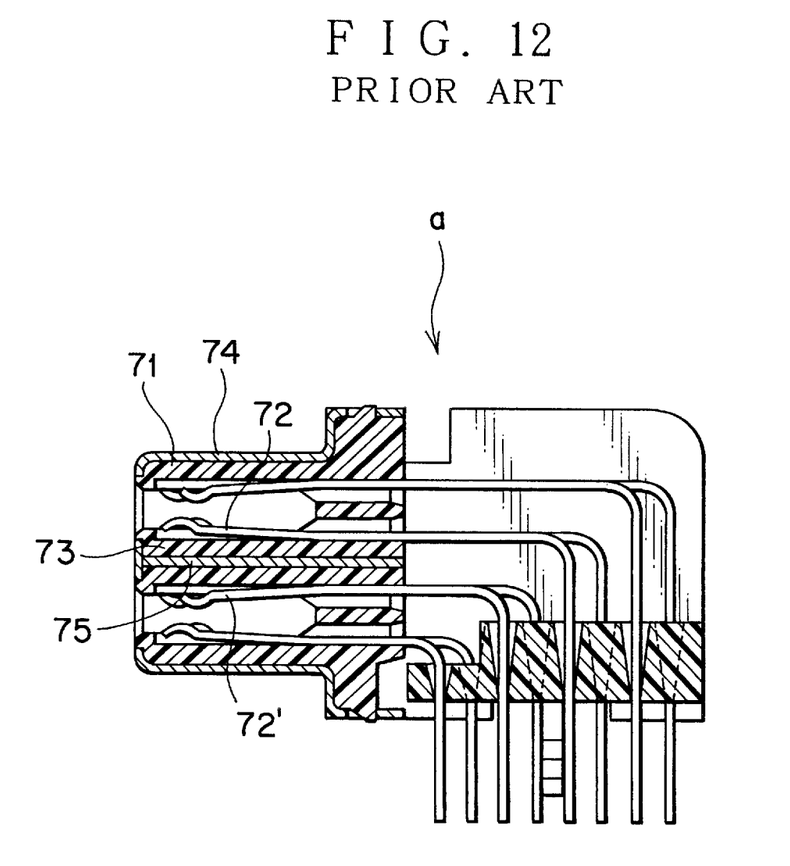
FIG. 12 is a cross-sectional view of a connector having a conventional electromagnetic shielding structure.

In order to improve the shock resistance of the connector device, the entire periphery of the connector device may be covered with metal as is often the case with an electromagnetic shielding connector. FIG. 12 shows an example of such an electromagnetic shield connector a as has been disclosed in Japanese Patent Publn. No. 5-290927. As seen from FIG. 12, the outer periphery of a housing 71, made of synthetic resin, is covered with a metallic shell 74. A partition 73, separating a plurality of contacts 72 and 72' located within the housing 71, incorporates a metallic plate 75 in contact with the metallic shell 74. Covering the entire outer periphery of the housing made of synthetic resin with metal, as in the electromagnetic shielding connector a, increases the weight, thus making it difficult to handle and increasing the production cost. The connector, of which the outside is made of metal, gives a man doing a charging operation, a psychological burden that he may get an electric shock.

Figure 13:
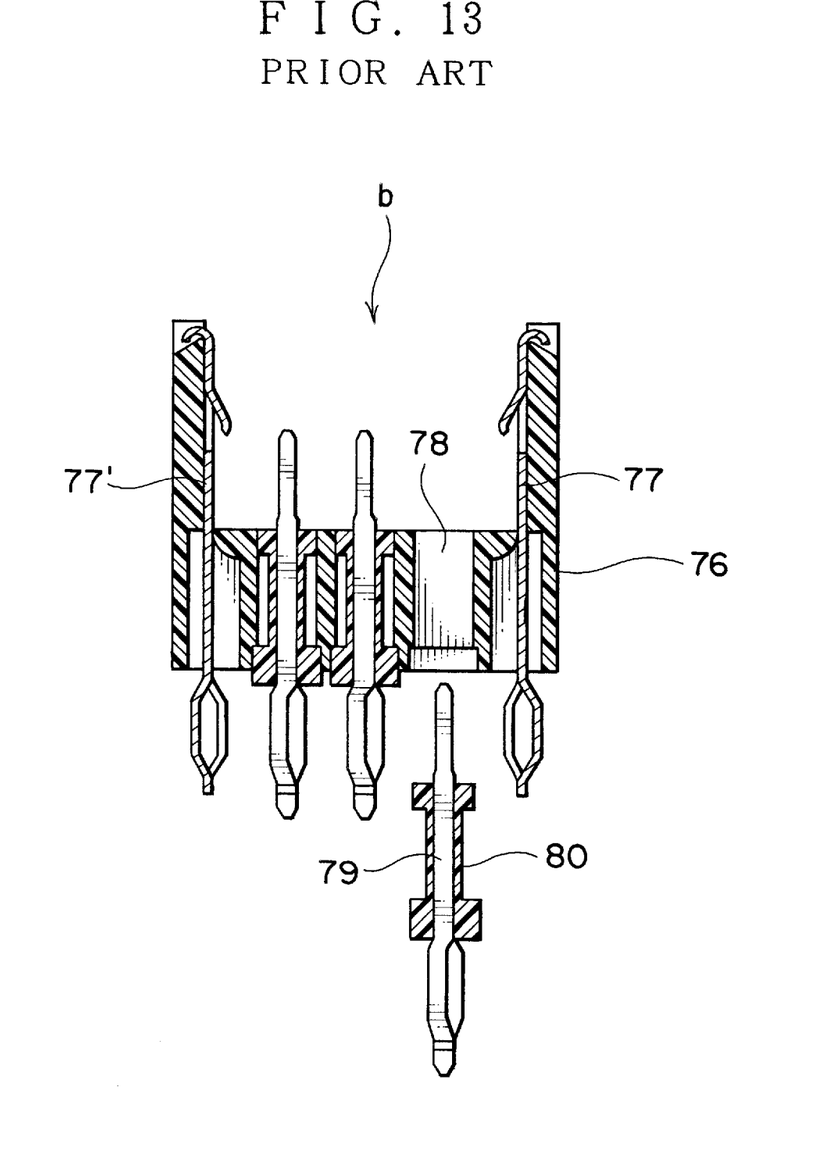
FIG. 13 is a cross-sectional view of a connector having another conventional electromagnetic shielding structure.

On the other hand, as shown in FIG. 13 and disclosed in JP-A-1-124979, a high density coaxial connector b has a structure in which an electric power bus 77 and a grounding bus 77' both have a layer of dielectric material. Both the electric power bus 77 and the grounding bus 77' are provided in an outer housing 76 made of metalized plastic. A terminal 70 is fit in a path 78 within the outer housing through an inner housing 80. Further covering the outer periphery of the metallic plate (power bus 77 and grounding bus 77') with an insulating housing (outer housing 76), like the coaxial connector b, increases the number of components and hence the production cost.

SUMMARY OF THE INVENTION

An object of the present invention is to provide a charging connector device with higher shock resistance, which can be fabricated at low cost, without increasing the weight to a large amount.

In accordance with the present invention, a charging connector device is provided for an electric vehicle which is composed of a first connector on a power supply side and a second connector on a power receiving side. The first connector has a cylindrical connector housing with an inner surface covered with a circular waterproofing packing. The circular waterproofing packing is to be engaged with the second connector in a rear half of the first connector and covered with a packing holder for preventing the water proofing packing from coming off a front half of the first connector. Further, the packing holder preferably has a circular protrusion provided at an outer periphery of a front end thereof. The circular protrusion serves to protect the front end of the connector housing. The circular protrusion is preferably made of metal or synthetic resin having shock resistance.

In accordance with the present invention, the front half of the inner surface of the connector housing is supported and reinforced by the packing holder of metal or synthetic resin having shock resistance, and the circular protrusion is provided at the outer periphery of the front end of the connector housing to protect the front end. Therefore, even when the second connector slips from the user's hand on to the floor or the ground, the second connector will not be easily damaged. The packing holder is not conspicuous because a greater part of the packing holder is received within the connector housing. Therefore, even if the packing holder is made of metal, a man performing the changing operation need not fear receiving an electric shock. Furthermore, since the packing holder serves as a reinforcement member for increasing the shock resistance of the connector housing, the number of components of the connector device is not increased.

The above and other objects and features of the present invention will be more apparent from the following description taken in conjunction with the accompanying drawing figures.

DETAILED DESCRIPTION OF THE INVENTION

Now referring to the drawing figures, an explanation will be given of embodiments of the present invention.

Figure 1:
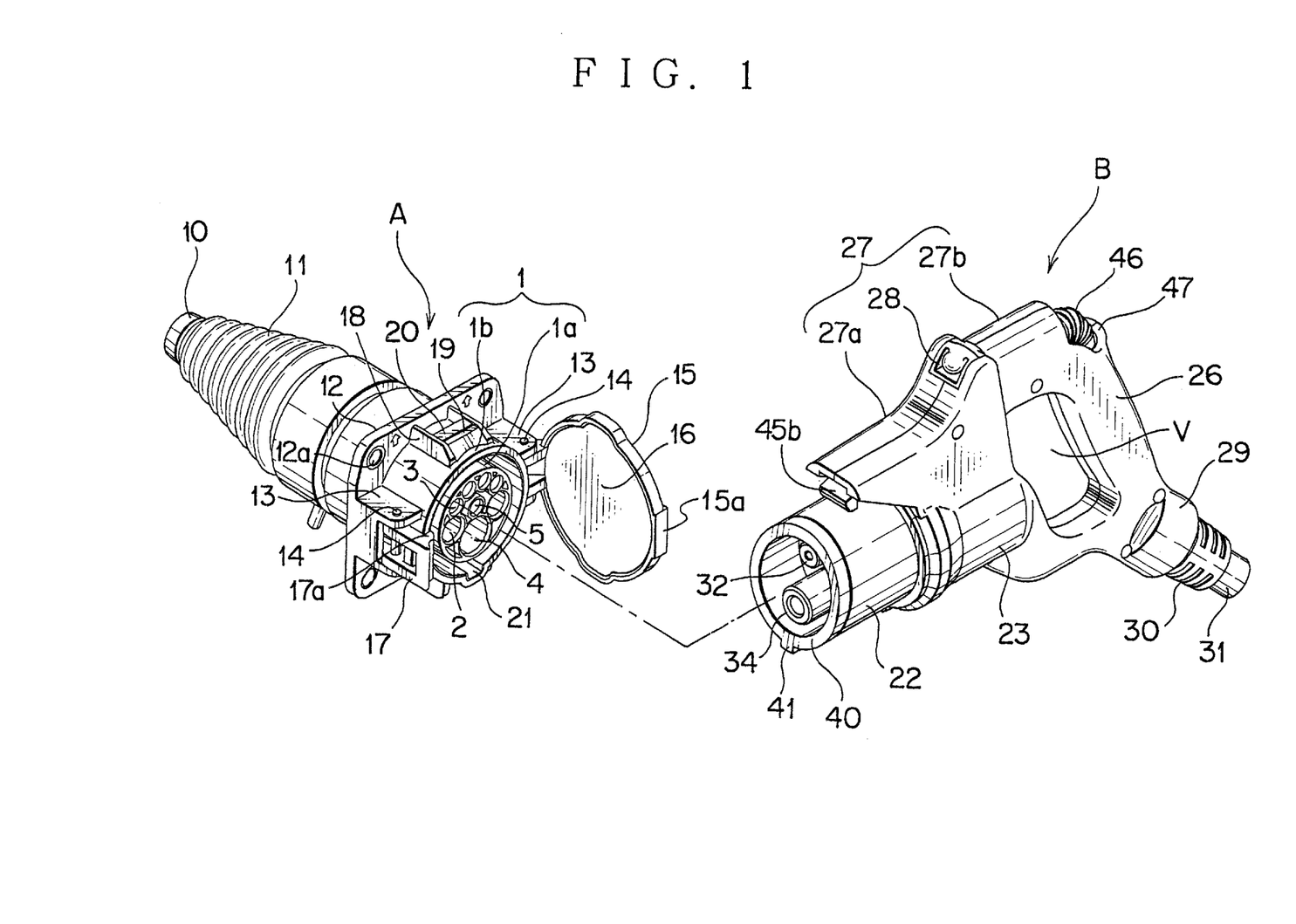
FIG. 1 is a perspective view of the first embodiment of a charging connector according to the present invention in a state where a power receiving connector and a power supply connector are separated.
Figure 2:
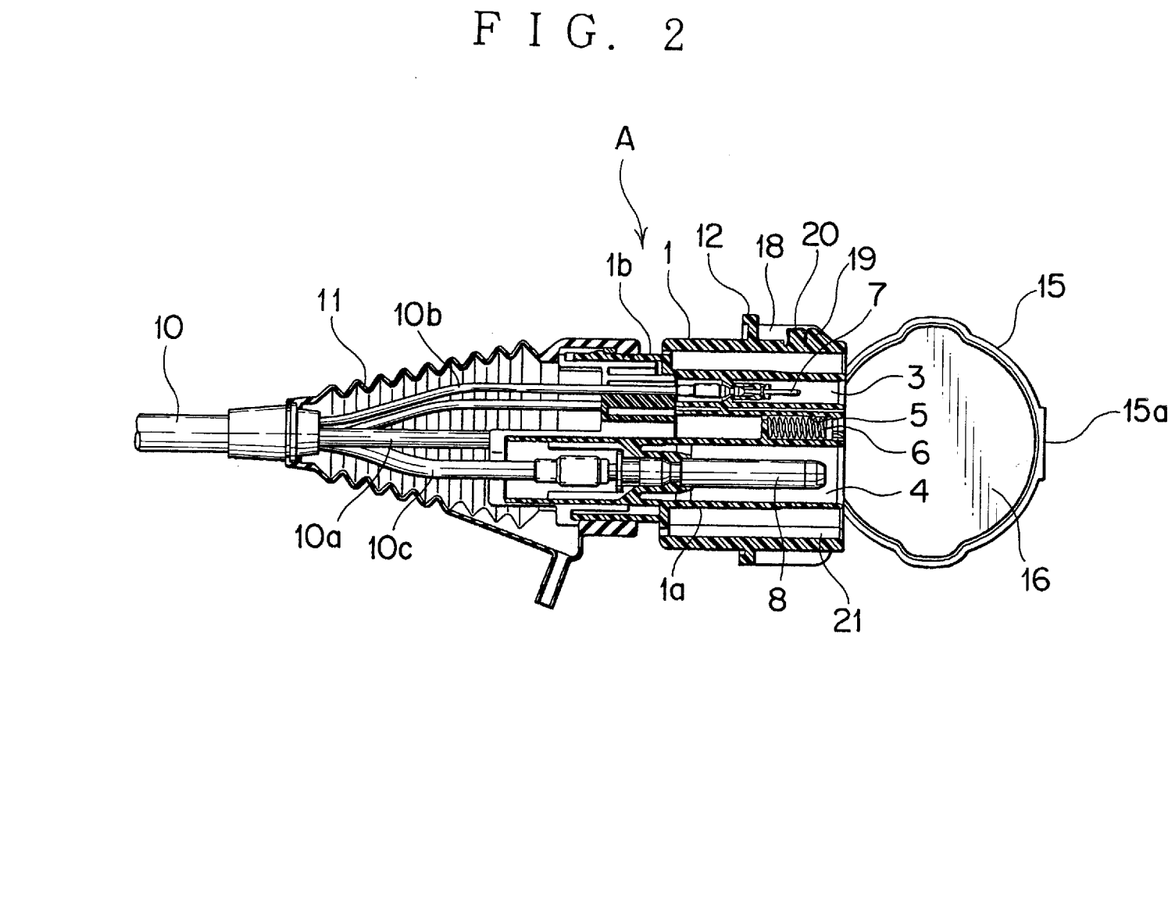
FIG. 2 is a longitudinal cross-sectional view of the receiving connector in FIG. 1.
Figure 3:
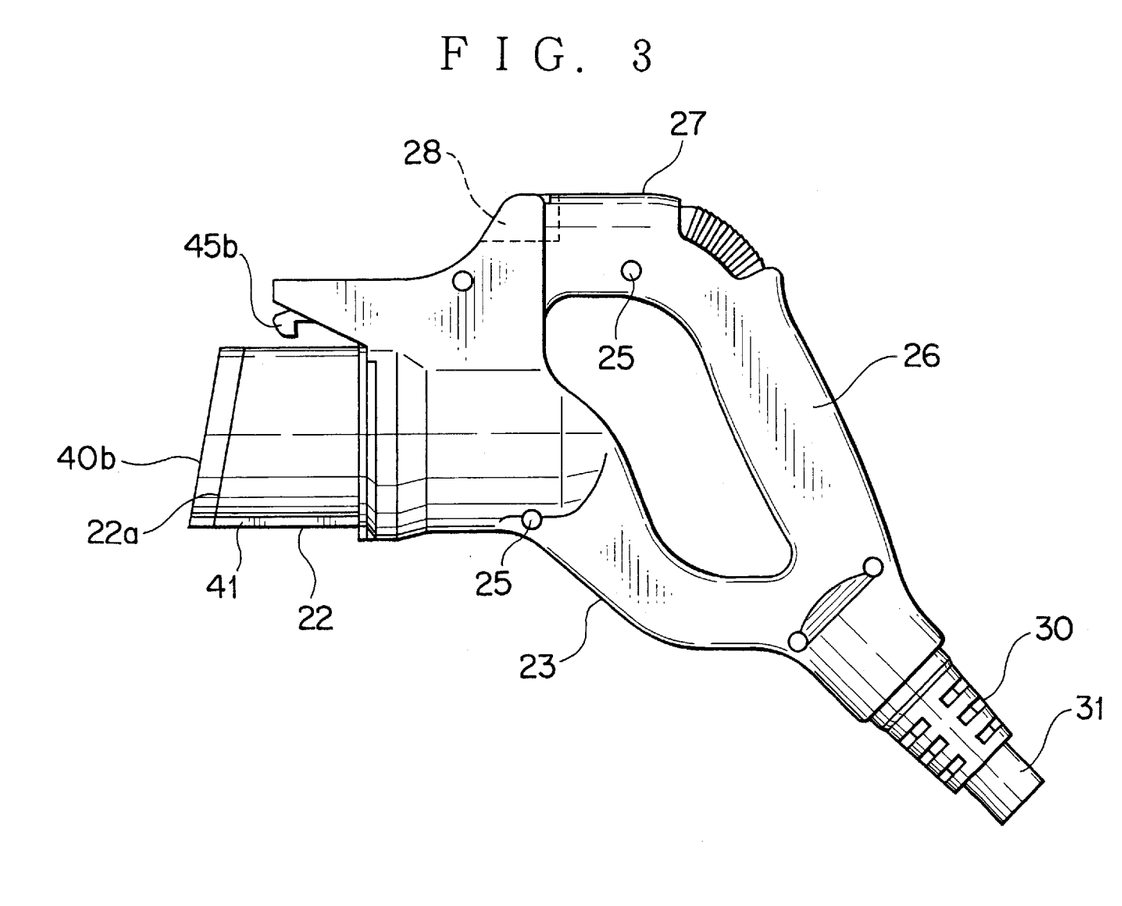
FIG. 3 is a front view of the power supply connector of FIG. 1.
Figure 4:
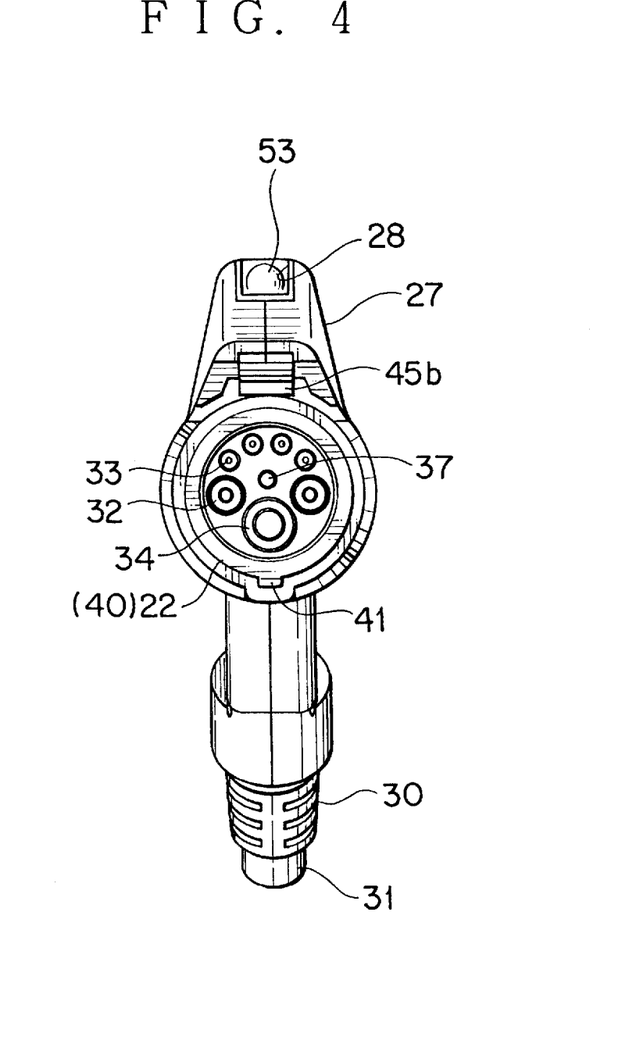
FIG. 4 is a left side view of FIG. 3.
Figure 5:
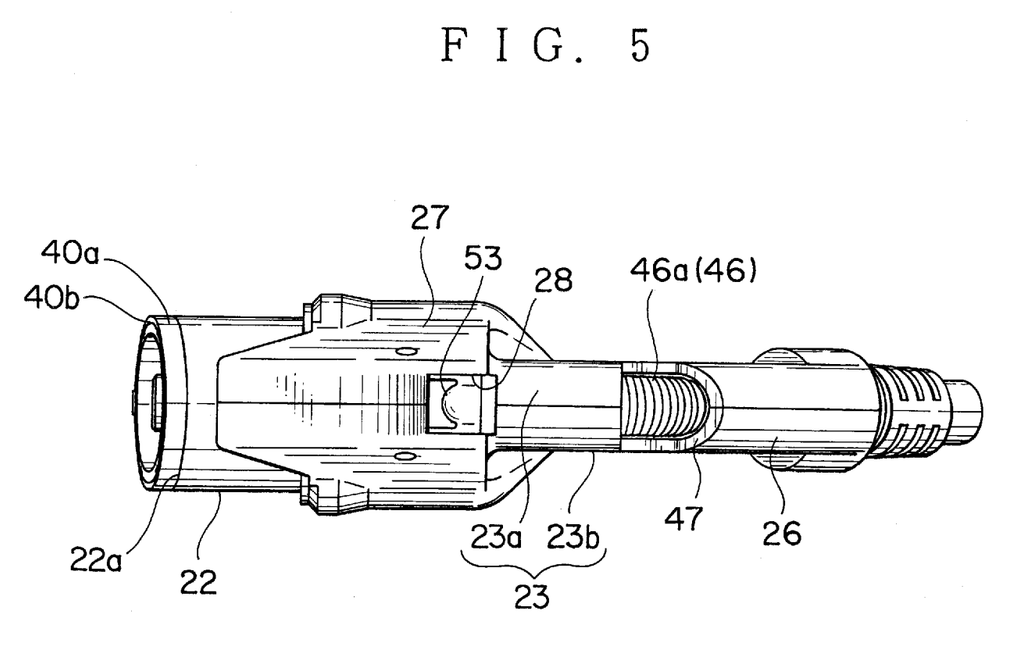
FIG. 5 is a plan view of FIG. 3.

In FIGS. 1 and 2, element A denotes a power receiving connector attached to a vehicle body and element B denotes a power supply connector.

In the power receiving connector A, a housing 1 is made of a synthetic resin insulating material, and is formed in a double-cylinder structure composed of an inner cylindrical housing 1a and an outer cylindrical housing 1b. Inside the inner housing 1a, plural terminal chambers 2, 3 and 4, which are cylindrical and have different diameters, are located individually. At a central area, a spring chamber 5, incorporating a returning spring 6, is located. The returning spring 6 urges the power supply connector B towards a returning direction to promote separation of the connectors during removal thereof. In the terminal chambers 2, 3 and 4, a charging male terminal (not shown) connected to a battery, a signal male terminal 7 for display and control of a charging state, and a grounding male terminal 8, are inserted, respectively. The respective male terminals are connected to lead wires 10a, 10b and 10c of a cable 10 and extracted through a grommet 11 covered on the rear end of the outer housing 1b. The charging male terminal (not shown) has the same structure as that of the ground male terminal, but is slightly smaller. A flange 12, having bolt holes 12a, protrudes from the outer intermediate portion of the outer housing 1b, and is secured to the vehicle body. On both sides of the front of the flange 12, a pair of brackets 13 are positioned uprightly so as to separate the front half of the outer housing 1b. The first bracket is provided with a cap 15 which is openable/closable by a first pin shaft 14, and the second bracket is provided with a locking piece 17 which is rotatable by a second pin shaft 14. The cap 15 is provided with a receiving seat 15a to be engaged with an engagement piece 17a at the tip of the locking piece 17. The cap 15 is also equipped with a sealing packing 16 on an inner face thereof to permit dust proofing or water proofing when not in use. A securing piece 19, which is sandwiched between a pair of protection guide walls 18 and which has a sloped front, is provided on an upper side at a front half of the outer housing 1b. A metallic enforcement piece 20, for preventing abrasion, is fit at the rear of the securing piece 19. On the lower side of the outer housing 1b, a guide groove 21, which corresponds to a guide strip 41 of the power supply connector B, is made in a coupling direction.

In FIG. 1 and FIGS. 3–6, a case body 23 is coupled with the rear end of a connector housing 22 of the power supply connector B, wherein the connector housing 22 is made of a synthetic resin insulator. The case body 23 is composed of a pair of division-type cases 23a and 23b, which are tightened by nuts 25. The nuts 25 passes through screw-passing holes 24 formed at the collating edges of the division-type cases 23a, 23b, respectively. The case body 23 is coupled with a grip 26 through a space V at a rear thereof. The case body 23 also includes a locking lever chamber 27 having an illumination chamber 28 at the upper side of the locking lever chamber 27 and a cable connection portion 29 at the rear of the lower side of the locking lever chamber 27. The cable connection portion 29 is connected to a cable 31 through a cable protector 30.

The connector housing 22 has a cylindrical shape. A front end surface 22a of the connector housing 22, as seen from FIGS. 3 and 5, has an inclined-cut shape with a lower side being longer than an upper side. Terminal chambers 32, 33 and 34, to be inserted into the terminal chambers 2, 3 and 4 of the power receiving connector A, are located inside the connector housing 22. The corresponding charging male terminal (not shown), signal female terminal 35, and grounding female connector 36, are inserted into the terminal chambers 32, 33 and 34, respectively. A pusher 37, corresponding to the above returning spring 6, protrudes at the center of the terminal chambers 32, 33, 34. As seen from FIG. 6, the front end of the grounding female terminal 36 and a terminal chamber 34, corresponding thereto, is formed to protrude more forwardly than does the signal female terminal 35, and a terminal chamber 36, corresponding thereto, also protrudes more forwardly than does the charging female terminal and a terminal chamber 32, corresponding thereto. The lead wires 31a, 31b, and 31c of the cable 31 connected to the respective female terminals, over which water-proofing stoppers 38 are fit to make individual water-proofing sealing for the respective terminal chambers, are arranged and secured within a main cable path 55 (described further below) of the case body 23.

Figure 6:
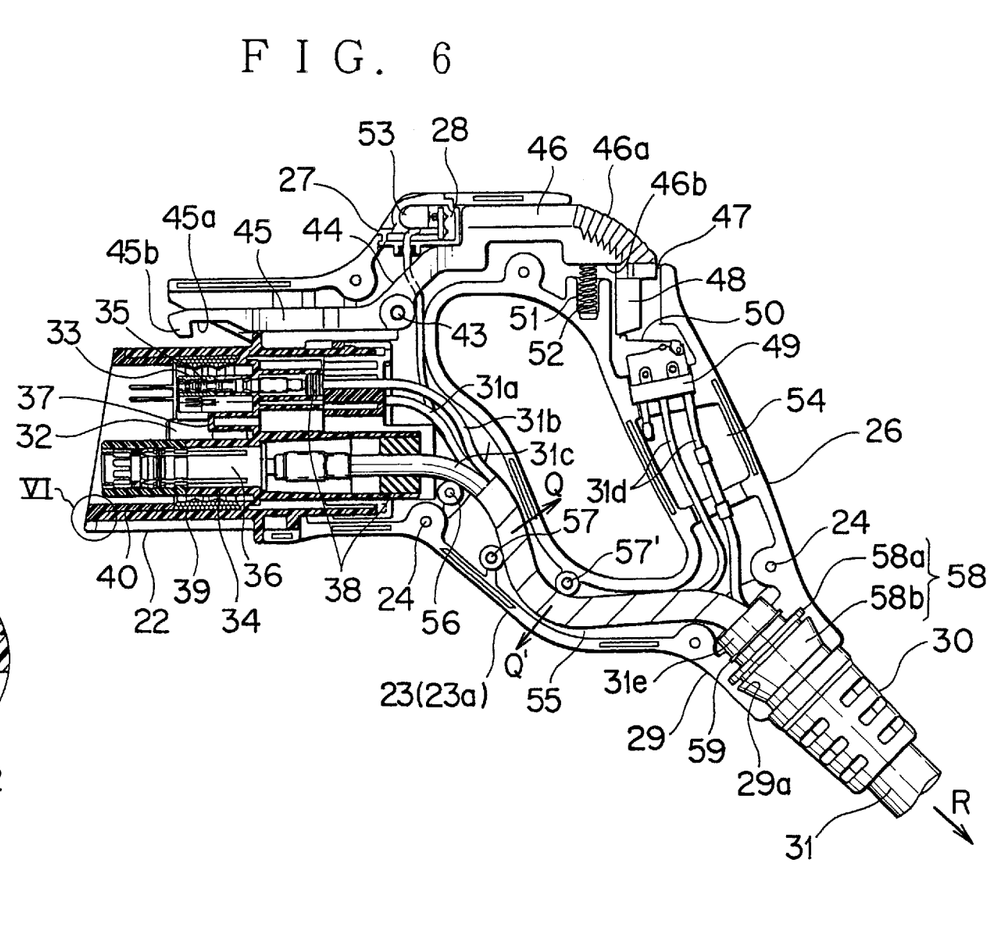
FIG. 6 is a longitudinal cross-sectional view of the power supply connector of FIG. 1.
Figure 6A:
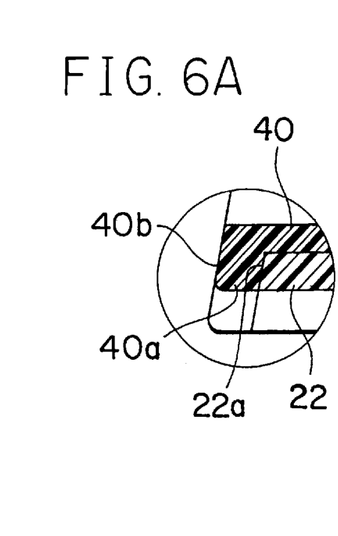
FIG. 6A is an enlarged view of the area within area VI in FIG. 6.
Figure 7:
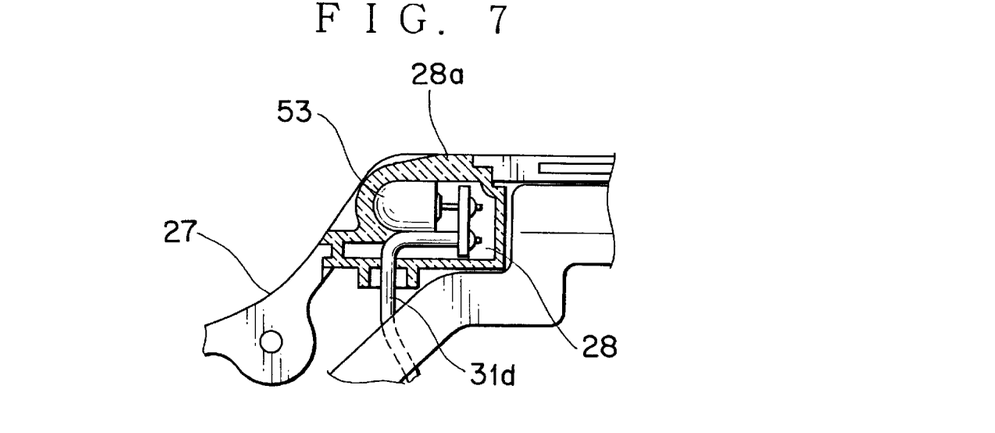
FIG. 7 is an enlarged view of an indicator of FIG. 6.

The rear half of the inner face of the connector housing 22 is fit with a water-proofing packing 39 having a uniform width. The front half of the inner face of the connector housing 22 is fit with a packing holder 40 made of metal such as iron and stainless steel. The packing holder may be made of reinforcement plastic having a large shock withstanding property. The packing holder 40, in accordance with the above inclined front surface 22a of the connector housing 22, is formed to have a width gradually increasing from a top to a bottom thereof. A ring-shaped convex portion 40a, formed on the outer peripheral surface, is fit to cover the front end surface of the housing 22 to protect and reinforce the tip of the connector housing 22. On the other hand, on the outer surface of the connector housing 22, a guiding protruding strip 41 corresponding to the guide groove 21 is formed on the lower side.

In the case body 23 of the connector housing 22, the upper lock lever chamber 27 is composed of a front chamber 27a and a rear chamber 27b. The illumination chamber 28 formed on the top of the chamber 27 is equipped with a two-color indicator lamp 53 of light emitting diode or LED as will be described further below.

A locking lever 44 is rotatably supported by a shaft 43 at a central position inside the locking lever chamber 27. The locking lever 44 is made of metal, such as aluminum, iron, stainless steel, etc., similar to the packing holder 40. The locking lever 44 includes an acting arm 45, at the front thereof, and an operating arm 46. The front end of the acting arm 45 protrudes from the front chamber 27a and is located in proximity to the outer wall of the connector housing 22. Inside the front end (i.e., on the side of the connector housing 22), a securing piece 45b is formed via a concave portion 45a. The rear end of the operating arm 46 extends toward a window 47, which is opened into the upper side of the grip 36, and a pressing portion 46a, equipped with an embossing, is exposed. From a first end of the lower surface 46b of the pressing portion 46a, a pressing piece 48, extending into a path 54 of the grip 26, is protruded, and the first end of the lower surface 46b of the pressing portion 46a is either in proximity to or in contact with a switch spring of a microswitch 49. The second end of the lower surface 46b of the pressing portion 46a is urged upwardly by a coil spring 51 of a spring chamber 51 so that the acting arm 45 is always urged downwardly (i.e., toward the connector housing 22).

On the lower side of the case body 23, the pair of division-type cases 23a and 23b form a main cable path 55 for the plural lead wires 31a, 31b, ... constituting the cable 31 so as to communicate with the cable connection portion 29. From the main cable path 55, a wire holding shaft 56 protrudes so as to be in proximity to the rear end opening of the terminal chamber 34 into which the grounding terminal 36 is inserted. The wire holding shaft 56 holds the lead wire 31c, having the largest diameter, which is connected to the grounding female terminal 36 at the center portion in the vicinity of the terminal chamber 34 so that the waterproofing stopper 38 is not inclined to prevent the water proofing characteristic from being lowered.

The lead wire 31c, similarly to the lead wires 31a and 31b, is tape-wound and secured by two wire securing shafts 57 and 57' for tension reduction provided between the wire holding shaft 56 and cable connecting portion 29. Namely, the wire securing shafts 57 and 57' are protruded toward the center of the path in opposite directions with a required interval from each other. The lead wires, such as the lead wire 31a, are tape-wound and are pressed by the wire securing shafts 57 and 57' in opposite directions indicated by arrows Q and Q' and hence, are fixed in a curved state within the main cable path 55. This prevents or relaxes direct application of tension from the outside.

These lead wires are externally extracted, together with the lead wire 31d of the above-described microswitch 49, through a cable protector 30 fit in the cable connection portion 29. The cable protector 30 has a grommet 58 composed of a flange 58a and a tapered tube 58b adjacent thereto. The grommet 58 is fit in the cable connection portion 29 in such a manner that a C-shaped stopper ring 59 is fit over a terminal sheath 31e of the cable 31 extending from the flange 58a and the tapered tube 58b is conformed to the tapered portion 29a formed at the end of the main cable path 55, i.e. opening end of the cable connection portion 29. For this reason, even when the cable 31 is pulled in the direction of arrow R, tapered tube 58b is tightened by the tapered portion 29a so that the cable 31 does loosen or come off.

Figure 8A:
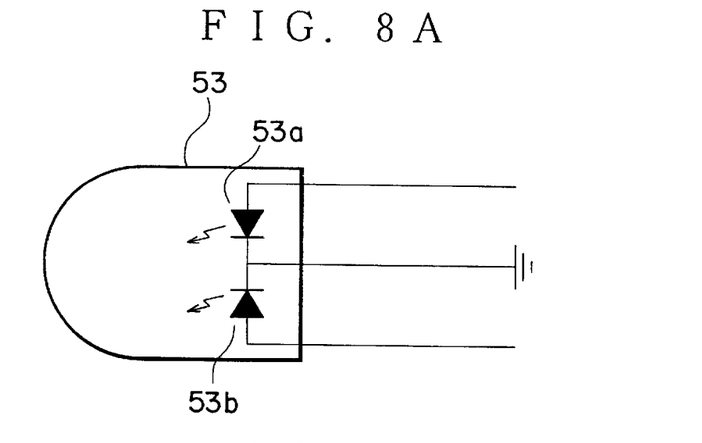
FIG. 8A and 8B are circuit diagrams of an illumination circuit including an indicator lamp of FIG. 6.

Thus, because of the fixing/tightening force of the grommet of the cable protector 30 being fit in the cable connection portion 29 and the pressing/friction force being moved in opposite directions by the wire securing shafts 57 and 57', external tension is not entirely applied or even almost applied, to the lead wires 31a, 31b, . . . of the cable 31 so that loosening of the cable 31 or the cable 31 coming off is prevented. On the other hand, a clear case 28a is fit in the illumination chamber 28 at the upper side of the case body 23, and an indicator lamp 53 is set inside the clear case 28a. The indicator lamp 53 may be a two-color type LED device composed of two light-emitting diodes 53a and 53b as shown in FIG. 8A. This LED is configured so that in the stand-by mode, i.e., when the cable 31 is connected to a charger C (FIG. 8B), the one LED 53a emits green, and in the charging mode, the other LED 53b emits red.

Figure 8B:
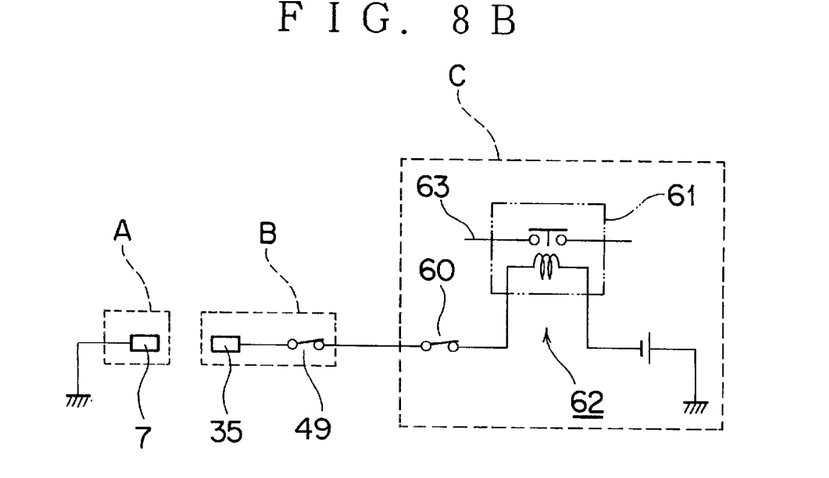

The microswitch 49, to be engaged with the pressing piece 48 of the locking lever 44, is connected to a control circuit (safety pilot circuit) 62 equipped with a switch 60 and a relay 61 in the charger C. In operation, when the power receiving connector A and the power supply connector B are completely coupled to each other, the switch 60 turns on so that the relay operates. As a result, a current flows through the power supply circuit 63 (male and female terminals and lead wires 10a and 31a).

An explanation will be given of a method of using the power supply connector B.

When the cable 31 is connected to the charger C in FIG. 8B, the illumination circuit, in FIG. 8A, causes the green light emitting diode 53a, of the indicator lamp 53, in the illumination chamber 28, to emit light. Thus, since the front surface and upper surface of the power supply connector B is illuminated with light, coupling of the connectors can be done safely without missing a mark, even in the dark or at night.

In carrying the power supply connector B for coupling with a power receiving connector A as needed, the power supply connector B may slip from a hook or a person's hand to hit on the floor or the ground. But, in such a case, since the front of the connector housing 22 is protected by the metallic packing holder 40, the entire power supply connector, inclusive of the case body 23, will not be damaged.

Next, the power supply connector B will be coupled with the power receiving connector A.

Since the front of the connector housing 22 (front 40b of the packing holder 40) in the power supply connector B is slanted, when the grip 26 is grasped by hand, the tip of the power supply connector B can be easily inserted into the gap between the outer housing 1b and inner housing 1a of the power receiving connector A. With the guiding strip 41 on the lower side, as shown in FIG. 1, and aligned with the guide groove 21 of the connector A (FIG. 1), coupling of the connectors can be done smoothly.

Figure 9:
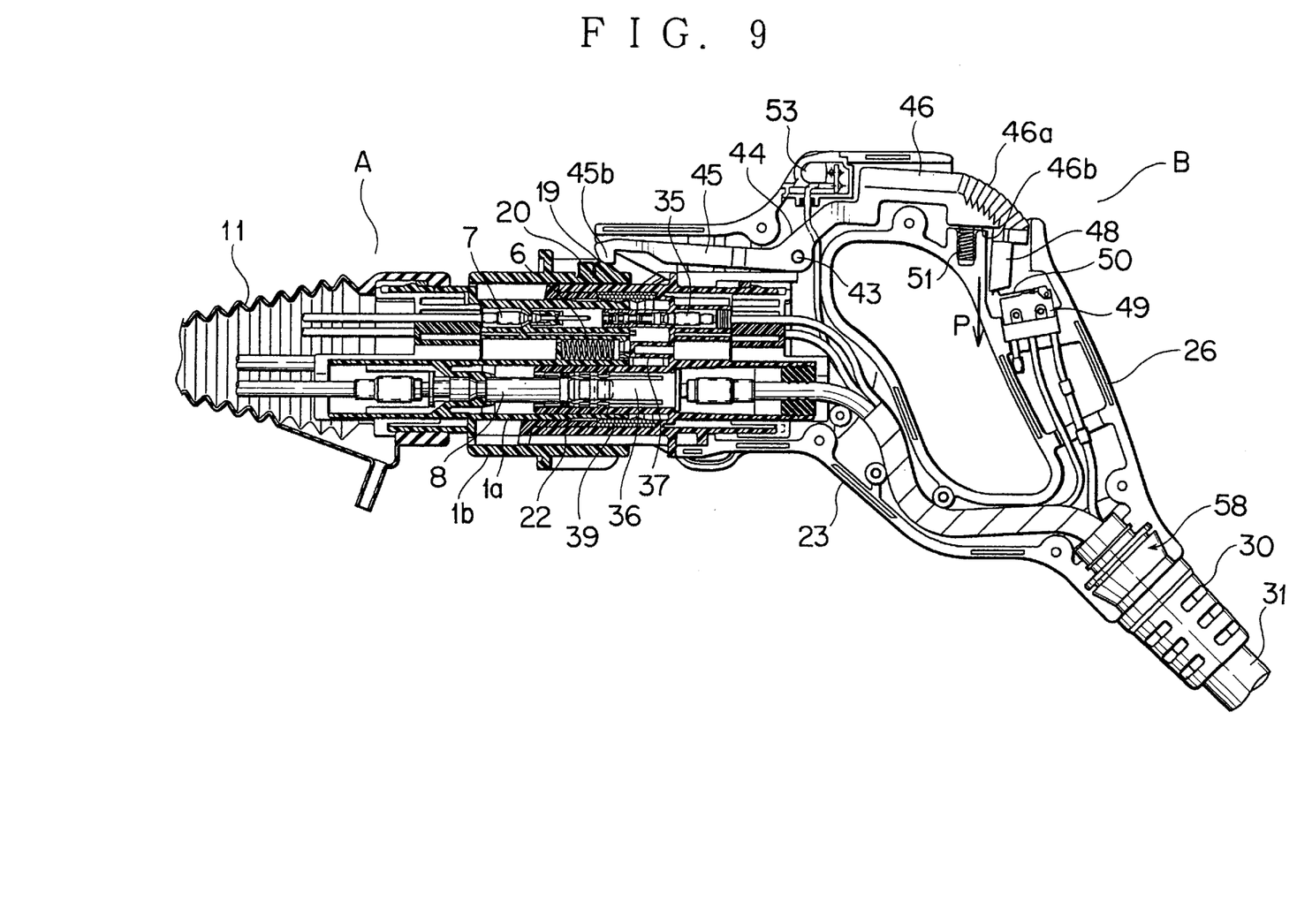
FIG. 9 is a cross-sectional view of the interim state of coupling the power supply connector and the receiving connector of FIG. 1.

FIG. 9 shows the interim state of the coupling of the connectors A and B. In the interim coupling, the tip of the inner housing 1a of the power receiving connector A reaches the middle of the ring-shaped water-proof packing 39 in the power supply connector B. The returning spring 6 and pusher 37 are not yet brought into contact with each other. Therefore, the power supply connector B can be smoothly inserted into the power receiving connector A with very slight resistance. First, the grounding terminal 8 and the female terminal 36 are brought into contact with each other. Thus, the entire charging circuit is grounded so that an electric shock of a worker and damage due to short-circuiting of both connectors A and B can be prevented from happening.

At the same time as the above-described grounding, the securing piece 45b, at the front end of the front acting arm 45 of the locking lever 44, runs onto the front slope of the securing protrusion 19 of the power receiving connector A. Thus, the rear operating arm 46 is pressed down against the coil spring 51 as indicated by arrow P so that the pressing piece 48 presses down the switch spring 50 of the microswitch 49. Then, the microswitch 49 turns "off". Even when the switch 60 of the charger C in the control circuit 62, as shown in FIG. 8B, is "on", the contact of the relay 61 is opened so that no current flows through the charging circuit 63.

Figure 10:
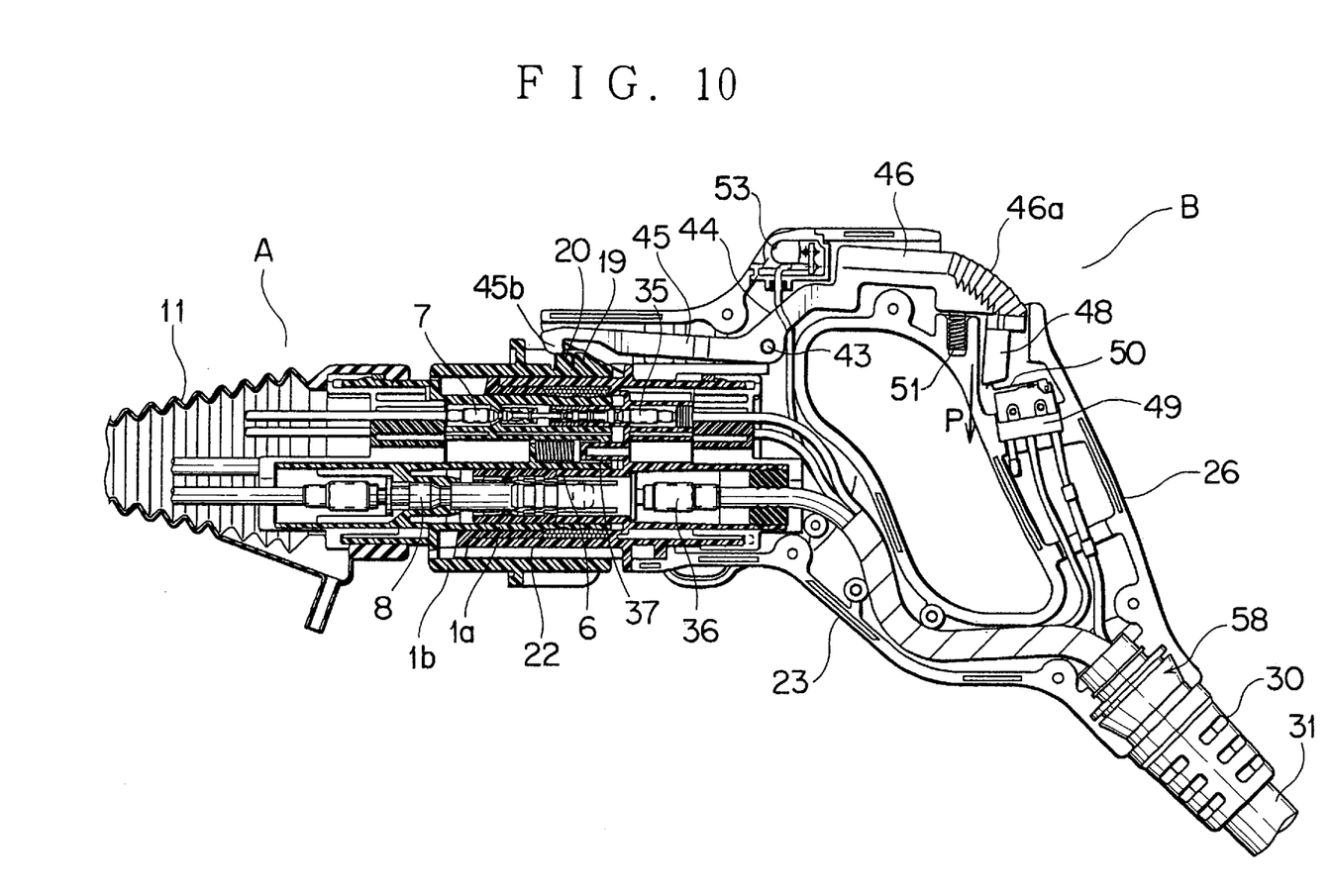
FIG. 10 is a cross-sectional view of the interim state successive to the state of FIG. 9.

FIG. 10 shows the interim coupling state at the next stage. When the power supply connector B is further inserted, the pusher 37 hits the returning spring 6. Therefore, coupling of the power supply connector B with the power receiving connector A is carried out against the elastic force. As seen from FIG. 10, since the connection between the signal male terminal 7 and the signal female terminal 35 and the connection between the charging male terminal and charging female terminal are also started, the force required for coupling is increased. Since the securing piece 45b of the locking lever 44 is still on the rear of the securing protrusion, the microswitch 49 is still "off" and hence, no current flows through the charging circuit. When a worker detaches his hand from the power supply connector B to stop the coupling operation in the state shown in FIG. 10, the power supply connector B can be easily removed by the spring-back operation of the returning spring 6. By increasing the elasticity of the returning spring 6, the power supply connector B can be returned to the semi-coupling state by the spring back operation of the returning spring 6.

Figure 11:
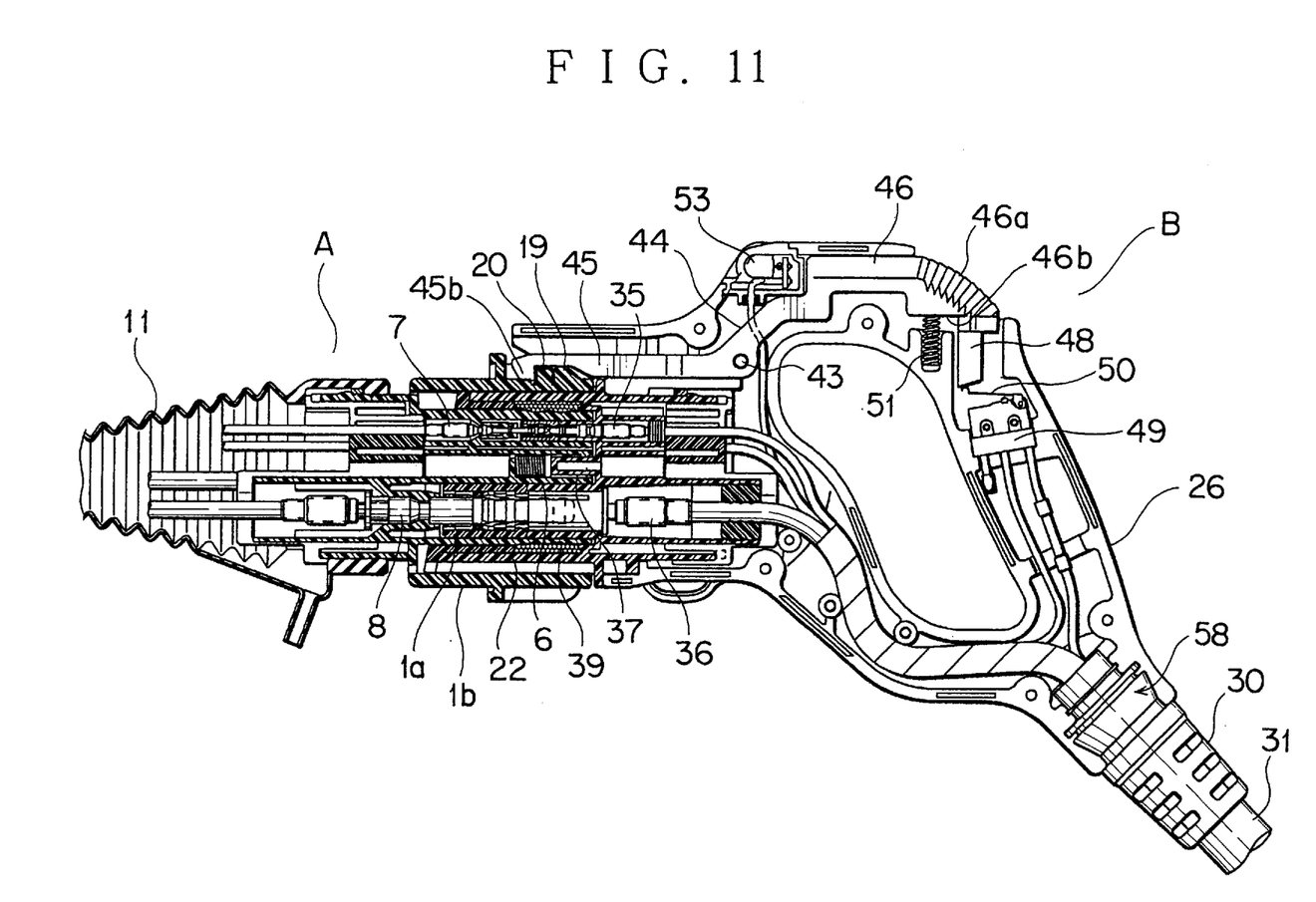
FIG. 11 is a cross-sectional view of the state of completion of the coupling.

FIG. 11 shows the complete coupling state of the power receiving and supply connectors A and B. In the state shown in FIG. 10, when the power supply connector B is pushed into the power receiving connector A against the elastic force of the returning spring 6, both the power receiving and supply connectors A and B are completely coupled with each other.

Specifically, the securing piece 45b runs over the securing protrusion 19, and the locking lever 44 is returned elastically by the coil spring 51. Thus, the securing piece 45b is engaged with the rear face of the securing protrusion 19. Simultaneously, the male and female terminals for charging, the male and female terminals 35 and 7 for signal, and the male and female terminals for grounding 36 and 8, are completely connected to each other. The elastic return of the locking lever 44 releases the pressing-down force of the switch spring 50 by the pressing piece 48 so that the microswitch 49 turns "on". Thus, in the control circuit 62, as shown in FIG. 8B, the contact of the relay 61 is closed so that the charging circuit 63 is energized, thus starting the charging.

As described above, only when the power receiving connector A and the power supply connector B are in a completely coupled state, as shown in FIG. 11, does the control circuit 62, i.e., the safety pilot circuit, turn "on", thus allowing charging. In the interim coupling state shown in FIGS. 9 or 10, the control circuit 62 is "off", similarly to before coupling, so that the charging will not be carried out in an unstable state.

Further, removal (release of coupling) of both power receiving and supply connectors A and B can be done very easily. Specifically, after completion of charging, when the pressing portion 46a of the operating arm 46, exposed from the window of the grip 26, is pushed down by, e.g., the thumb, the forward acting arm 44 can be easily lifted by leverage on the supporting point of the shaft 43 so that the engagement of the securing piece 45 and the securing protrusion 9 is released. Thus, the pushing-back force of the returning spring 6 is applied to the power supply connector B through the pusher 37 so that the power supply connector B can be easily separated from the power receiving connector A by a small force. During the separation process, the microswitch 49 is in an "off" state, similar to in the interim coupling, so that the charging circuit 63 is not energized.

What is claimed is:

1. A charging connector device for an electric vehicle comprising:

a first connector on a power receiving side having inner and outer housings with a guide groove at a bottom of and through an inner surface of said outer housing;

a second connector on a power supply side, wherein said second connector comprises:

a cylindrical connector housing having an inner surface, an outer surface, and a sloped front end surface, wherein a guide strip is located at a bottom of said outer surface of said cylindrical connector housing for cooperating with said guide groove of said first connector in order to aid in properly guiding said second connector into said first connector;

a cylindrical waterproofing packing entirely covering said inner surface of said cylindrical connector housing, wherein said cylindrical waterproofing packing is for engaging a rear half of said second connector; and a packing holder completely covering a front surface of said cylindrical waterproofing packing for preventing said cylindrical waterproofing packing from coming off a front half of said second connector housing, wherein said packing holder has a ring-shaped convex portion which protrudes radially outwardly from an outer periphery of said packing housing at a front end of said packing holder for covering said sloped front end surface of said connector housing; and wherein said connector device is energized when said first and second connectors are completely coupled to each other.

2. The charging connector device for an electric vehicle according to claim 1, wherein said ring-shaped convex portion is made of any one of a metal and a synthetic resin having shock resistance.

* * * * *